(12) United States Patent
Lee

(10) Patent No.: US 10,756,369 B2
(45) Date of Patent: Aug. 25, 2020

(54) FUEL CELL SYSTEM FOR EXHAUSTING RESIDUAL POWER IN EMERGENCY SITUATION

(71) Applicants: HYUNDAI MOTOR COMPANY, Seoul (KR); KIA Motors Corporation, Seoul (KR)

(72) Inventor: Nam Woo Lee, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 150 days.

(21) Appl. No.: 16/133,555

(22) Filed: Sep. 17, 2018

(65) Prior Publication Data

US 2019/0379070 A1    Dec. 12, 2019

(30) Foreign Application Priority Data

Jun. 8, 2018    (KR) .................. 10-2018-0066293

(51) Int. Cl.

| H01M 8/04828 | (2016.01) |
|---|---|
| B60L 3/00 | (2019.01) |
| H01M 8/04664 | (2016.01) |
| H01M 8/04089 | (2016.01) |
| B60L 58/30 | (2019.01) |

(52) U.S. Cl.
CPC ......... *H01M 8/0494* (2013.01); *B60L 3/0053* (2013.01); *B60L 58/30* (2019.02); *H01M 8/04089* (2013.01); *H01M 8/04664* (2013.01)

(58) Field of Classification Search
CPC .................................................. H01M 8/0494
See application file for complete search history.

(56) References Cited

U.S. PATENT DOCUMENTS

| 3,432,356 | A | * | 3/1969 | Christianson | ..... | H01M 8/04589 429/432 |
|---|---|---|---|---|---|---|
| 6,819,066 | B2 | | 11/2004 | Ishikawa et al. | | |
| 2011/0093148 | A1 | * | 4/2011 | Kuehner | .................. | H02H 3/14 701/22 |

(Continued)

FOREIGN PATENT DOCUMENTS

| KR | 10-0878661 B1 | 1/2009 |
|---|---|---|
| KR | 10-2014-0110170 A | 9/2014 |

*Primary Examiner* — Daniel J Cavallari
(74) *Attorney, Agent, or Firm* — Lempia Summerfield Katz LLC

(57) ABSTRACT

Disclosed is a fuel cell system that stops producing electricity and exhausts residual electricity in an emergency situation. The fuel cell system includes a stack receiving a reactive gas including a hydrogen and/or an oxygen to produce the electricity, a pump supplying the reactive gas to the stack, a discharge circuit including a resistor that discharges a residual power in the stack and a first relay that electrically connects or disconnects the resistor to or from the stack, a generator connected to a rotational shaft of the pump to convert a driving energy of the rotational shaft of the pump to an electric energy, and a first controller controlling the first relay. The first controller receives the electric energy from the generator and controls the first relay to electrically connect the stack and the resistor such that the residual electricity in the stack is exhausted in the emergency situation.

9 Claims, 2 Drawing Sheets

(56) References Cited

U.S. PATENT DOCUMENTS

| | | | |
|---|---|---|---|
| 2013/0200855 A1* | 8/2013 | Christensen | B60L 3/0007 |
| | | | 320/136 |
| 2017/0179760 A1* | 6/2017 | Jawany | H02J 7/0029 |
| 2018/0026282 A1* | 1/2018 | Lee | H01M 8/04552 |
| | | | 429/429 |
| 2018/0034077 A1* | 2/2018 | Berg | H01M 8/0488 |

* cited by examiner

# FUEL CELL SYSTEM FOR EXHAUSTING RESIDUAL POWER IN EMERGENCY SITUATION

CROSS-REFERENCE TO RELATED APPLICATION

This application is based on and claims the benefit of priority to Korean Patent Application No. 10-2018-0066293, filed on Jun. 8, 2018, in the Korean Intellectual Property Office, the disclosure of which is incorporated herein in its entirety by reference.

TECHNICAL FIELD

The present disclosure relates to a fuel cell system for exhausting a residual power in an emergency situation.

BACKGROUND

A hydrogen fuel cell vehicle is one of eco-friendly vehicles and includes a fuel cell system that produces electricity through an electrochemical reaction between hydrogen and oxygen. When the fuel cell vehicle crashes, a secondary accident such as electric shock or fire may occur due to a residual high voltage in a fuel cell stack.

The disclosure of this section is to provide background of the invention. Applicant notes that this section may contain information available before this application. However, by providing this section, Applicant does not admit that any information contained in this section constitutes prior art.

SUMMARY

An aspect of the present invention provides a fuel cell system capable of preventing people in a vehicle from suffering injury by a secondary accident due to a residual power in a fuel cell stack.

The technical problems to be solved by the present inventive concept are not limited to the problems disclosed in the specification, and any other technical problems not mentioned herein will be clearly understood from the following description by those skilled in the art to which the present invention pertains.

According to an aspect of the present invention, a fuel cell system, which stops producing electricity and exhausts a residual electricity in an emergency situation, includes at least one stack receiving a reactive gas including a hydrogen and/or an oxygen to produce the electricity, a pump supplying the reactive gas to the stack, a discharge circuit including a resistor that discharges a residual power in the stack and a first relay that electrically connects or disconnects the resistor to or from the stack, a generator connected to a rotational shaft of the pump to convert a driving energy of the rotational shaft of the pump to an electric energy, and a first controller controlling the first relay. The first controller is electrically connected to the generator to receive the electricity generated by the driving of the rotational shaft of the pump and controls the first relay to electrically connect the stack and the resistor such that the residual electricity in the stack is exhausted in the emergency situation.

According to another aspect of the present invention, a fuel cell system of a vehicle having a stack includes a discharge circuit including a resistor that discharges electricity in the stack and a first relay that electrically connects or disconnects the resistor to or from the stack, a first controller operating the first relay, and a power supply supplying a power to the first controller. The power supply includes a main power supply supplying the power to the first controller and an emergency power supply supplying the power to the first controller when the main power supply is malfunctioning, and the first controller controls the first relay such that a residual electricity in the stack is discharged through the resistor of the discharge circuit in an emergency situation.

According to a further aspect of the invention, the fuel cell system may control a relay to supply an emergency power to a sub-controller using a generator connected to a rotational shaft of a pump that supplies gas to a fuel cell stack. The sub-controller controls an additional relay to connect the stack and electricity discharging circuit such that the residual power or electricity in the stack is quickly discharged to the circuit for exhausting the residual power or electricity in a situation in which a main power supply, e.g., a battery, or a power supply line is damaged or a main controller is malfunctioning. The sub-controller may receive the emergency power during the emergency situation and may continuously transmit the control signal to the additional relay. In embodiments, the additional relay electrically connecting or disconnecting the stack to or from the discharge circuit may be implemented by the normal open type relay rather than the normal closed type relay that is expensive, and thus a cost for the fuel cell system may be reduced.

In addition, an RPM of the pump rapidly decreases by the electricity production of the generator, and thus the supply of the reactive gas to the stack is blocked to inhibit the electricity from being further produced in the stack. That is, the secondary accident may be prevented from occurring to the people in a vehicle in the emergency situation.

BRIEF DESCRIPTION OF THE DRAWINGS

The above and other aspects, features and advantages of the present invention will be more apparent from the following detailed description taken in conjunction with the accompanying drawings.

DETAILED DESCRIPTION

Figure 1:
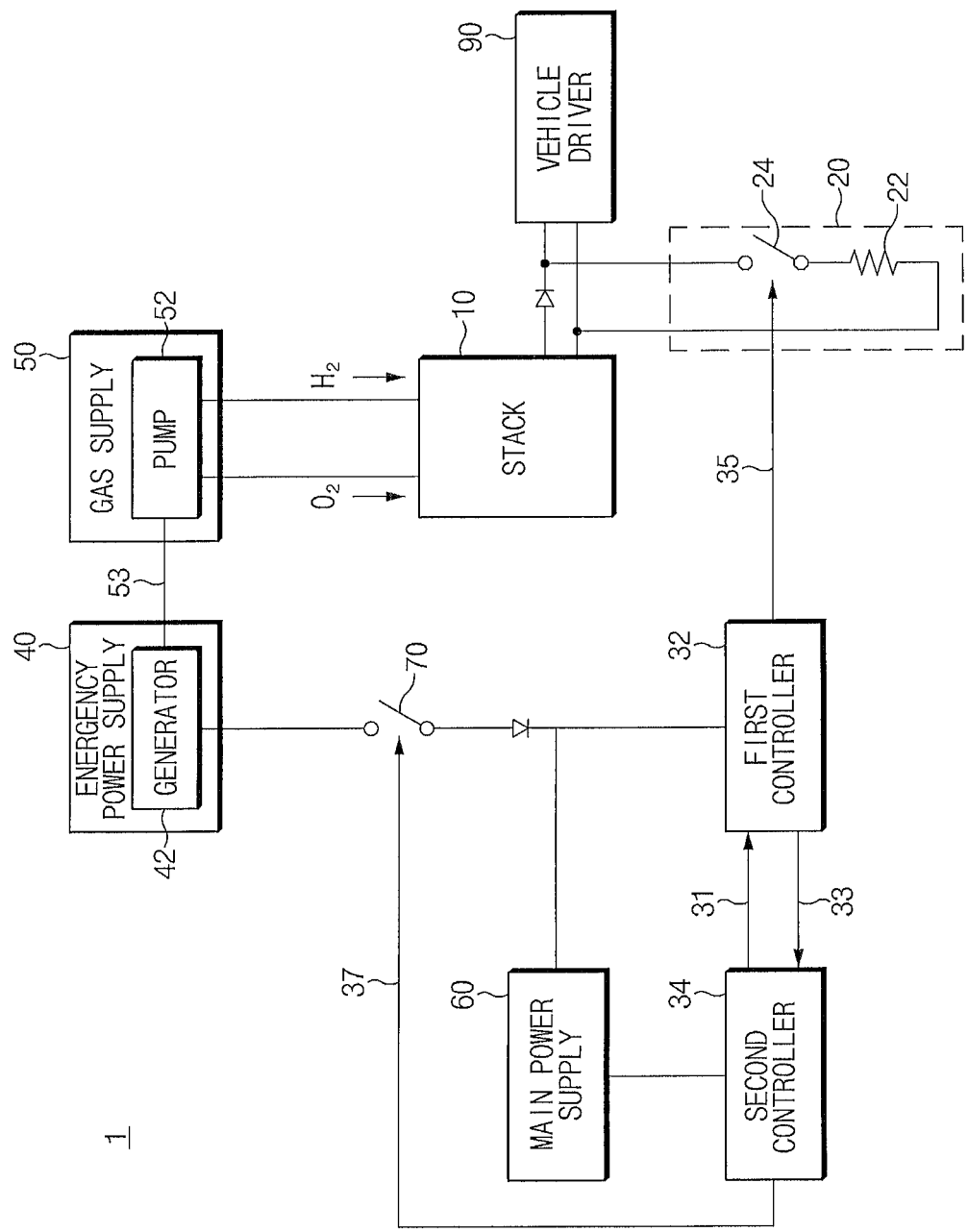
FIG. 1 is a block diagram illustrating a fuel cell system of a vehicle according to an embodiment.

Hereinafter, embodiments of the present invention will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present invention.

In describing elements of embodiments of the present invention, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

To avoid a secondary accident that may be caused by the crashes of fuel cell vehicles, the supply of hydrogen and oxygen to the fuel cell stack may be blocked. However, although the supply of hydrogen and oxygen is blocked, there is still a possibility of the secondary accident since a high voltage current resides inside the fuel cell stack.

FIG. 1 is a block diagram illustrating a fuel cell system 1 according to an embodiment.

The fuel cell system 1 according to an embodiment of the present invention may quickly block a reactive gas supplied to a stack 10 when an emergency situation, e.g., a vehicle crash, occurs, and may also quickly exhaust a residual electric power in the stack 10, thereby preventing or inhibit a secondary accident from occurring.

Referring to FIG. 1, in embodiments, the fuel cell system 1 may include a vehicle driver system 90, a stack 10, a gas supply 50, a discharge circuit 20, a first controller 32, a second controller 34, and an emergency power supply 40. The stack 10 produces electricity and supplies the produced electricity to the vehicle driver system 90. The gas supply 50 supplies the reactive gas to the stack 10. The discharge circuit 20 discharges the residual power in the stack 10. The first controller 32 controls electric connection or disconnection between the discharge circuit 20 and the stack 10. The second controller 34 controls the first controller 32. In an embodiment, the second controller 34 may be a vehicle's control unit. The main power supply 60 supplies electric power to the first controller 32 and the second controller 34. The emergency power supply 40 supplies electric power to the first controller 32 in the emergency situation. The reactive gas may include hydrogen and/or oxygen.

According to an embodiment, the stack 10 may receive the reactive gas including the hydrogen and/or the oxygen from the gas supply 50 and produce the electricity. The stack 10 may include a first electrode receiving the hydrogen, a second electrode receiving the oxygen, and a membrane electrode assembly disposed between the first electrode and the second electrode. The hydrogen may react with the oxygen in the membrane electrode assembly to produce the electricity. The produced electricity may be supplied to the vehicle driver system 90. The vehicle driver system 90 may include at least one electric motor. The electric motor may be driven by the electricity supplied thereto from the fuel cell system.

According to an embodiment, the gas supply 50 may include at least one pump 52 for supplying the reactive gas including the hydrogen and/or the oxygen. As an example, the pump 52 may include an air compressor. A generator 42 may be connected to a rotational shaft 53 of the pump 52. When the rotational shaft 53 is coupled to the generator 42, rotational of the rotational shaft 53 of the pump 52 may be converted to an electric energy or electricity by the generator 42. The electricity generated by the generator 42 can be supplied to the first controller 32 in the emergency situation. In an emergency situation, the generator 42 is connected to the rotational shaft 53 of the pump 52 and brakes the rotation of the shaft 53 while generating electricity. Thus, the rotation of the rotational shaft 53 of the pump 52 may be gradually slowed down, and as a result, the drive or operation of the pump 52 may be stopped. In this case, the reactive gas may no longer be supplied to the stack 10, and the stack 10 does not generate electricity.

According to an embodiment, the discharge circuit 20 may be connected to an electricity output line of the stack 10. The discharge circuit 20 may include at least one resistor 22 and a switch electrically connecting or disconnecting the discharge circuit 20. As an example, the switch may include one or more relays. In one embodiment, the switch includes a first relay 24. When the first relay 24 is in a closed state, the electricity produced by the stack 10 or remained in the stack 10 may be depleted by the resistor 22. When the first relay 24 is in an open state, the electricity produced by the stack 10 may be supplied to the vehicle driver 90. According to various embodiments, the first relay 24 may be a normal open type relay. The normal open type relay may indicate a relay that remains in the open state when there is no control signal. The first relay 24 may remain in the open state when a control signal 35 shown in FIG. 1 is not applied to the first relay 24 and may remain in the closed state when the control signal 35 is applied to the first relay 24.

According to an embodiment, the first controller 32 may operate the first relay 24 included in the discharge circuit 20. As an example, the first controller 32 may apply the first control signal 35 to the first relay 24. The first controller 32 may open the first relay 24 to connect the discharge circuit 20 to the stack 10. The first controller 32 may close the first relay 24 to disconnect the discharge circuit 20 from the stack 10. Meanwhile, the first controller 32 may receive a control request 31 for the first relay 24 from the second controller 34. The first controller 32 may provide a feedback response 33 about the state of the first relay 24 to the second controller 34.

In embodiments, the first controller 32 may include at least one micro-controller, however, it should not be limited to the micro-controller. As an example, the first controller 32 may be implemented by only passive elements without active elements. As another way, the first controller 32 may be implemented by only a logic circuit without the micro-controller. This is to allow the first controller 32 to operate the first relay 24 without receiving a control instruction from the second controller 34 such that the residual power in the stack 10 is quickly discharged when the second controller 34 controlling the first controller 32 is damaged or the main power supply 60 supplying the power to the second controller 34 is damaged under the emergency situation, e.g., vehicle crash.

In embodiments, the first controller 32 may receive the power from the emergency power supply 40 and the Main power supply 60 in vehicle's normal operation state. When the vehicle drives, the first controller 32 may receive the power from the main power supply 60. When the vehicle is in the emergency situation, the first controller 32 may receive the power from the emergency power supply 40. Accordingly, when the main power supply 60 is damaged in the emergency situation, e.g., vehicle crash, the first controller 32 may control or operate the first relay 24 using the emergency power supply 40.

According to an embodiment, the first controller 32 may determine the emergency situation, e.g., vehicle crash. For example, when the first controller 32 does not receive the control request for the control of the first relay 24 from the second controller 34 for a predetermined time period, the first controller 32 may determine that the emergency situation occurs. The emergency situation may include a case in which the second controller 34 or the main power supply 60 supplying the power to the second controller 34 is malfunctioning.

According to an embodiment, the second controller 34 may be electrically connected to the first controller 32. The second controller 34 may transmit the control request 31 to the first controller 32 to operate the first relay 24. In addition, the second controller 34 may receive the feedback response 33 of the state of the first relay 24 from the first controller 32. The second controller 34 may receive the power from the main power supply 60.

In embodiments, the second controller 34 may control the second relay 70 such that the emergency power supply 40 and the first controller 32 are electrically disconnected to each other when the vehicle is not in the emergency situation or is in the vehicle's normal operation state. The second controller 34 may control the second relay 70 such that the emergency power supply 40 and the first controller 32 are electrically connected to each other when the main power supply 60 is not capable of supplying the power to the first controller 32 in the emergency situation. For example, the second controller 34 may transmit a second control signal 37 to the second relay 70 when the second controller determines that the vehicle is in an emergency state.

According to an embodiment, the main power supply 60 may supply the power to the first controller 32 and the second controller 34. The main power supply 60 may supply the power to the first controller 32 and the second controller 34 during an ordinary state, in which the vehicle normally drives. In embodiments, in the vehicle's normal operation state, the emergency power supply is not connected to the first controller 32.

According to an embodiment, the emergency power supply 40 may supply the power to the first controller 32 in the emergency situation, e.g., vehicle crash. The emergency power supply 40 may include the generator 42 connected to the rotational shaft 53 of the pump 52 of the gas supply 50. The generator 42 may convert a mechanical energy of the rotational shaft 53 of the pump 52 to the electric energy. The emergency power supply 40 may supply the electric energy to the first controller 32 in the emergency state. For this, the emergency power supply 40 and the first controller 32 may be connected to each other by the second relay 70.

In embodiments, the emergency power supply 40 and the first controller 32 may be electrically connected to each other when the second relay 70 is closed. The emergency power supply 40 may be electrically connected to the first controller 32 by the second relay 70. In the emergency situation, the generator of the emergency power supply 40 may be connected to the rotational shaft 53 of the pump 52 and produce the electricity while the rotational shaft 53 of the pump 52 rotates. The generated electricity is transmitted to the first controller 32 via the relay 70. On the other hand, in embodiments, the generator of the emergency power supply 40 is not connected to the rotational shaft 53 during the ordinary situation, and thus, does not produce the electricity.

According to an embodiment, the second relay 70 may connect the emergency power supply 40 to the first controller 32. In embodiments, the second relay 70 may be closed in the emergency situation, and thus the first controller 32 may be connected to the emergency power supply 40. According to various embodiments, the second relay 70 may be a normal close type relay. The normal close type relay may indicate a relay that remains in the closed state when there is no control signal and remains in the open state when the control signal is applied thereto. The second relay 70 may remain in the closed state when the second control signal 37 shown in FIG. 1 is not applied to the second relay 70. In embodiments, the second relay 70 may be controlled by the second controller 34 during the vehicle's normal operation state, and may remain in the open state when the second control signal 37 is applied to the second relay 70.

Figure 2:
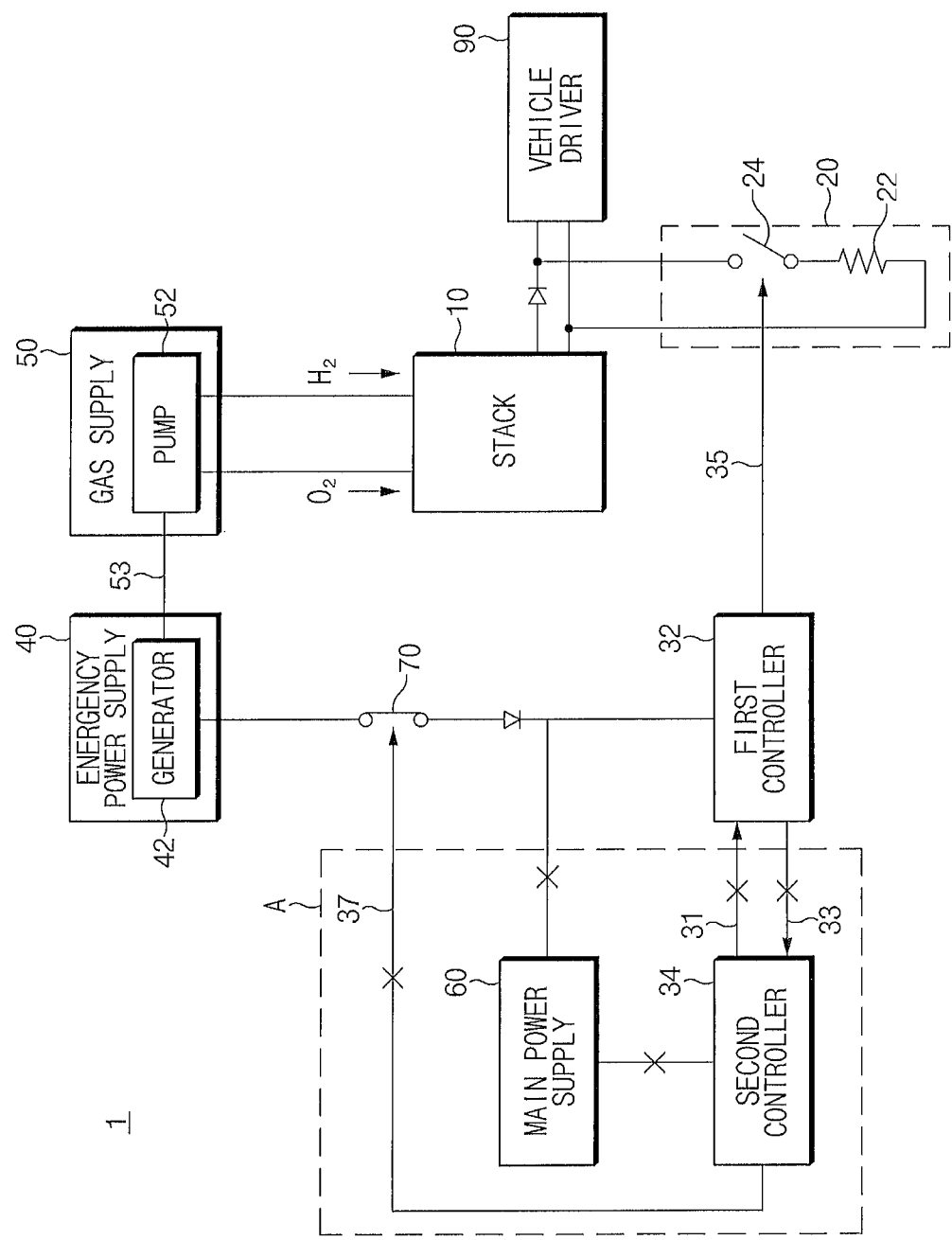
FIG. 2 is a block diagram illustrating an operation of the fuel cell system of a vehicle in an emergency situation according to an embodiment.

FIG. 2 is a block diagram illustrating an operation of the fuel cell system in the emergency situation according to an embodiment.

In the present descriptions, the term of "emergency situation" may include a situation that some portions of the fuel cell system 1 are malfunctioning, for example, by the vehicle's crash. As an example, a portion "A" shown in FIG. 2 or some components included in the portion "A" may malfunction in the emergency situation. In detail, when the main power supply 60 is damaged, the power may not be supplied to the second controller 34.

According to an embodiment, when the vehicle is in the emergency situation such as the vehicle crash, the secondary accident such as electric shock to people in a vehicle may occur due to a high-voltage electricity remaining in the stack 10. To prevent this, all remaining electricity in the stack 10 may be discharged. In addition, it is necessary to block the reactive gas including the hydrogen and/or the oxygen flowing into the stack 10 to stop further electricity production.

According to an embodiment, when the vehicle is in the emergency situation, the second controller 34 may be damaged or malfunctioning. The supply of the power to the second controller 34 may also be blocked. During the emergency state, since the second controller 34 does not receive electricity from the main power supply, the second controller 34 may no longer transmit the control signal to the second relay 70. In this case, the normal close type second relay 70 may remain in the closed state. Accordingly, the first controller 32 may receive the power from the emergency power supply 40 and control the operation of the relay 24.

Meanwhile, in an emergency state, the first controller 32 may close the first relay 24, which is the normal open type, and may electrically connect the discharge circuit 20 to the stack 10. Accordingly, the electricity remaining in the stack 10 may be discharged by the resistor 22 of the discharge circuit 20.

The generator 42 of the emergency power supply 40 may produce the electricity supplied to the first controller 32. The generator 42 may convert the mechanical energy of the rotational shaft 53 of the pump 52 to the electric energy, and thus the operation of the pump 52 of the gas supply 50 may be gradually stopped. When the operation of the pump 52 stops, the reactive gas including the hydrogen and being supplied to the stack 10 may be blocked.

Accordingly, although the main power supply 60 or the second controller 34 is malfunctioning in the emergency situation, the mechanical energy of the pump 52 may be converted to the electric energy to stop the supply of the hydrogen and/or the oxygen to the stack 10 and the discharge circuit 20 may be connected to the stack 10 to discharge the residual electricity in the stack 10. Therefore, the electric shock or the fire accident may be prevented from occurring to the people in the vehicle in the emergency situation, e.g., vehicle crash.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While the present invention has been described with reference to embodiments, it will be apparent to those skilled in the art that various changes and modifications may be made without departing from the spirit and scope of the present invention. Therefore, embodiments of the present invention are not limiting, but illustrative, and the spirit and scope of the present invention is not limited thereto. The spirit and scope of the present invention should be interpreted by the following claims, and it should be interpreted that all technical ideas which are equivalent to the present invention are included in the spirit and scope of the present invention.

What is claimed is:

1. A fuel cell control system and configured to stop producing electricity in a fuel cell and further configured to exhaust residual electricity in the fuel cell in an emergency situation, the system comprising:
   at least one stack configured to receive a reactive gas including a hydrogen and/or an oxygen to produce the electricity;
   a pump configured to supply the reactive gas to the stack;
   a discharge circuit including a resistor configured to discharge residual electricity in the stack and a relay that is configured to electrically connect or disconnect the resistor to or from the stack;
   a generator connected to a rotational shaft of the pump to convert rotation of the rotational shaft of the pump to electricity; and
   a controller configured to control the relay,
   wherein, in the emergency situation, the controller is electrically connected to the generator to receive the electricity generated by rotation of the rotational shaft of the pump, the controller being configured to control the relay to electrically connect the stack and the resistor such that the residual electricity in the stack is exhausted.

2. The system of claim 1, wherein the pump is configured to reduce a supply amount of the reactive gas to the stack when the generator and the controller is electrically connected.

3. The system of claim 1, wherein the relay includes a normal open type relay configured to remain in an open state when there is no control signal from the controller.

4. The system of claim 1, wherein the controller is referred to as a first controller and the relay is referred to as a first relay, the fuel cell control system further comprising:
   a second relay configured to electrically connect or disconnect the generator to or from the first controller; and
   a second controller configured to control the second relay, wherein the second controller is configured to control the second relay to electrically disconnect the generator from the first controller in a situation except for the emergency situation.

5. The system of claim 4, wherein the second relay includes a normal close type relay that is configured to remain in a closed state when there is no control signal from the second controller.

6. A system of a vehicle comprising:
   a fuel cell comprising at least a stack:
   a discharge circuit including a resistor configured to discharge electricity in the stack and a first relay that is configured to electrically connect or disconnect the resistor to or from the stack;
   a first controller configured to operate the first relay;
   a main power supply configured to supply power to the first controller;
   an emergency power supply configured to supply the power to the first controller when the main power supply is malfunctioning, and the first controller being configured to control the first relay such that residual electricity in the stack is discharged through the resistor of the discharge circuit in an emergency situation;
   a second controller configured to control the first controller and control supply of the power from the main power supply to the first controller; and
   a second relay configured to electrically connect or disconnect the emergency power supply to or from the first controller,
   wherein the second relay includes a normal close type relay to electrically connect the first controller to the emergency power supply when the main power supply is malfunctioning.

7. The system of claim 6, wherein the first relay includes a normal open type relay.

8. The system of claim 6, wherein the first controller and the second controller are electrically connected to each other, and the first controller being configured provide information indicative of a state of the first relay to the second controller in response to a control signal from the second controller.

9. The system of claim 6, further comprising a pump configured to supply reactive gas to the stack, wherein the emergency power supply includes a generator connected to a rotational shaft of the pump to convert rotation of the rotational shaft of the pump to electricity for supplying the electricity to the first controller in the emergency situation.

* * * * *